UNITED STATES PATENT OFFICE.

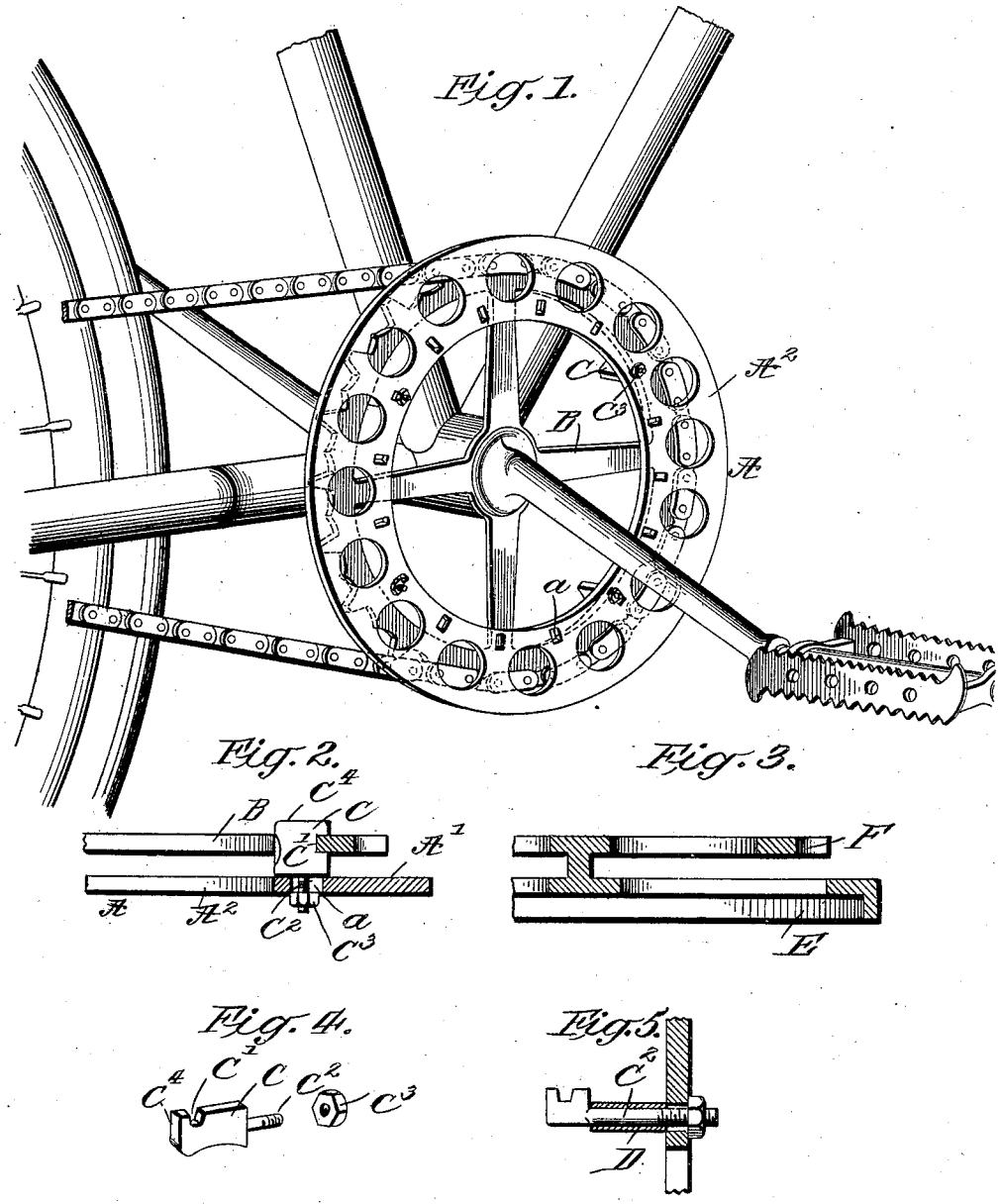

BENJAMIN MOSS BADGER, OF DILLON, SOUTH CAROLINA.

BICYCLE ATTACHMENT.

No. 877,820.

Specification of Letters Patent.

Patented Jan. 28, 1908.

Application filed March 19, 1907. Serial No. 363,260.

*To all whom it may concern:*

Be it known that I, BENJAMIN MOSS BADGER, a citizen of the United States, and a resident of Dillon, in the county of Marion and State of South Carolina, have made certain new and useful Improvements in Bicycle Attachments, of which the following is a specification.

My invention is an improvement in attachments for bicycles, being in the nature of a pants' guard for the drive sprocket; and the invention consists in certain novel constructions and combinations of parts as will be hereinafter described and claimed.

In the drawing—Figure 1 is a perspective view of the invention as in use. Fig. 2 is a detail section of a portion of the sprocket wheel and pants' guard illustrating the connection between the same. Fig. 3 illustrates a somewhat different construction from that shown in Fig. 2, and Fig. 4 illustrates in detail one of the fastening devices for securing the guard plate in position. Fig. 5 illustrates a spacing tube upon the bolt-like shank of the clip.

In carrying out my invention I provide, as shown in Figs. 1 and 2, a guard A fitting alongside the sprocket wheel B and having its inner side A' extending in a flat plane, the said guard A being in the form of a ring $A^2$ exceeding in diameter that of the sprocket wheel B so that it will project outwardly beyond the periphery of the sprocket wheel, as shown in Figs. 1 and 2 in the practical application of the invention. As shown the guard A is an open ring to permit its convenient application over the treadle and this ring is secured by suitable fastenings C to the sprocket wheel B. As shown the fastenings C comprise a series of clips having body portions notched in one edge at C' to engage with the sprocket wheel when the clips are turned outwardly to position for use, as shown in Figs. 1 and 2, and these clips are also provided with bolt-like shanks $C^2$ which project through slots $a$ in the guard plate and receive on their outer ends nuts $C^3$ which may be tightened to secure the clips in position to properly engage with the sprocket wheel when the parts are applied, as shown in Figs. 1 and 2. The slots $a$ are elongated radially so the clips may be adjusted out and in in order to adapt them to sprocket wheels of different sizes and the clips may be adjusted in these slots to properly engage with the sprocket wheel and may also be turned by the rotation of their shanks in the said slots in order to set the head-like portions $C^4$ of the clips into and out of engagement with the sprocket wheel in order to secure or release the guard plate, as desired in the use of the invention. These clips, as shown, constitute spacing devices for holding the guard a sufficient distance from the sprocket wheel to avoid any interference with the operation of the chain, but it will be understood that the spacing tubes D, as shown in Fig. 5, may be placed upon the bolt-like shanks $C^2$ to secure the guard plate a further distance from the sprocket wheel in the use of the invention if so desired.

It is preferred to make the guard ring separate from and secure it to the sprocket wheel as before described, as this permits the convenient application of the guard whenever desired and the placing of the guard upon wheels now in use.

It will be understood that where desired the guard ring may be made integral with the sprocket wheel as illustrated in Fig. 3 in which E represents the guard ring and F the sprocket, said parts being connected at G by the integral portion as illustrated in the said figure.

In the use of my invention it will be noticed that the guard protects the pantaloons from being torn or soiled as it holds them from contact with the chain at all times.

The guard ring may be made of any suitable metal or material of sufficient strength and durability to serve its purpose.

In applying the guard it will be noticed that no portion of the bicycle will be disturbed in the slightest the guard being simply passed over the pedal and crank, brought up to its place against the outer face of the sprocket wheel and the fastenings applied, requiring but little time and even less skill and labor.

I claim—

1. The combination of a sprocket wheel, a guard plate alongside the same and provided with radially elongated slots and clips having head-like portions provided with notches receving the sprocket wheel and also having outwardly projecting bolt-like shanks extending through the radial slots in the guard plate, and nuts on said shanks for securing the same in connection with the guard plate. substantially as set forth.

2. A pantaloon guard for bicycle sprocket wheels, comprising an open ring and clips movable radially in connection therewith for securing the same to a sprocket wheel the clips having means turning into and out of engagement with the sprocket wheel, substantially as set forth.

3. A trousers guard for bicycle sprocket wheels, comprising an open ring, and fastenings connected with said ring and capable of adjustment radially of said ring and projecting laterally from the ring for connection with a sprocket wheel, substantially as set forth.

4. A pantaloon guard for bicycle sprocket wheels, comprising an open ring provided with radial slots, and fastenings for securing the same to the sprocket wheel and having shanks adjustable radially in said slots, said fastenings having means for engagement with the sprocket wheel substantially as set forth.

5. A pantaloon guard comprising a guard plate having openings for fastening devices and fastening devices for securing the plate to a sprocket wheel and having means for engagement with the sprocket wheel and also having shanks adapted to turn in the openings of the guard plate and be adjusted radially therein, substantially as set forth.

6. A pantaloon guard for sprocket wheels comprising a guard plate having openings elongated radially, and fastening devices for securing the said plate to the sprocket wheel, said fastening devices having shanks turning in and movable radially in the openings of the guard plate, and provided with heads for engagement with the sprocket wheel substantially as set forth.

BENJAMIN MOSS BADGER.

Witnesses:
SOLON C. KEMON,
PERRY B. TURPIN.